Figure 1:
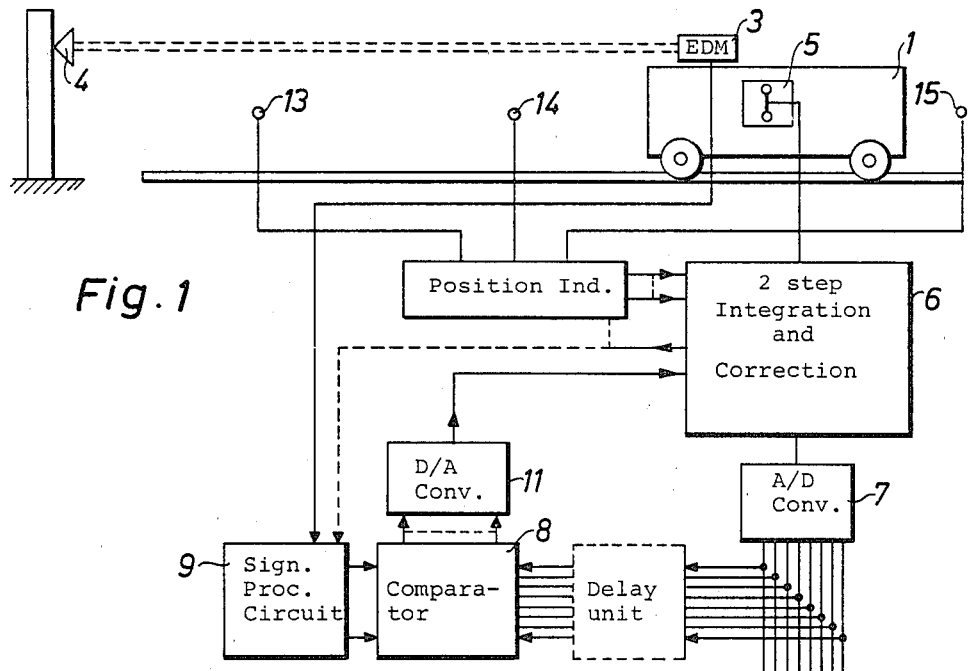

United States Patent [19]

Wiklund et al.

[11] 4,357,833

[45] Nov. 9, 1982

[54] POSITION DETERMINATION EQUIPMENT

[75] Inventors: Klas R. Wiklund; Lars Ericsson, both of Täby, Sweden

[73] Assignee: AGA Aktiebolag, Lidingo, Sweden

[21] Appl. No.: 183,669

[22] Filed: Sep. 2, 1980

[51] Int. Cl.³ .................. G01C 22/02; G01C 23/00
[52] U.S. Cl. ......................................... 73/490; 73/518
[58] Field of Search ............ 73/490, 510, 518, 178 R, 73/1 D; 364/454, 424, 448, 449, 451, 561; 340/24

[56] References Cited

U.S. PATENT DOCUMENTS

| | | | |
|---|---|---|---|
| 2,622,865 | 12/1952 | Sundt | 73/490 |
| 3,445,640 | 5/1969 | Harrison et al. | 364/561 |
| 3,789,198 | 1/1974 | Henson et al. | 364/424 |
| 3,940,597 | 2/1976 | DiMatteo | 364/454 |
| 4,250,403 | 2/1981 | Nomura et al. | 364/424 |

OTHER PUBLICATIONS

"Inertial Navigation" from Flight, vol. 71, No. 2516, pp. 474, 475, 478, Apr. 1957.

Primary Examiner—James J. Gill

Attorney, Agent, or Firm—Pollock, Vande Sande & Priddy

[57] ABSTRACT

An apparatus for determining the position of an object which is moving along an axis at frequent intervals of time and without making mechanical contact with the object, comprising position determinator means for providing an accurate position determination of said object at relatively long intervals of time or position, means associated with said object comprised either of the combination of speedometer means and electronic integration means for time integrating the output of said speedometer means at relatively frequent time intervals for providing an instantaneous measurement signal or the combination of accelerometer means and electronic integration means for double time integrating the output of said accelerometer means at relatively frequent time intervals for providing an instantaneous measurement signal, and means for correcting the value of said instantaneous measurement signal at said relatively long intervals of time or position to be equal to said position determination made by said position determinator means.

2 Claims, 2 Drawing Figures

POSITION DETERMINATION EQUIPMENT

This invention relates to a position determination equipment to touchlessly with frequent intervals of time determine the position along an axis of an object which moves along the said axis.

In accurate servo control of large objects such as for example rail-borne working machines, it has been both costly and difficult to determine the position of the object at each time. The most commonly previously used position determination devices have been of mechanical type. As a rule, chain-driven encoders have been used. The problem with these is both that they require extremely accurate alignment upon installation and that they slip and frequently have to be realigned. These devices often have top work in a mechanically very troublesome environment, such as in mines and steelworks. In such environments, it frequently occurs that large particles fly about. The measuring equipment then should be as insensitive as possible to mechanical influences. The output signal, moreover, is not sufficiently accurate for the exact position determination required for modern machining. One has also tried placing optical position transducers at the side of the track of the object, but these must be placed at very close intervals in order to give the requisite accuracy. Frequently, the distance along which the vehicle is to be able to move is very long. It will then be unpractical and expensive to only have many optical position transducers placed close to one another.

There has therefore long been a need to be able to accurately determine the position of an object with frequent intervals. This problem has now been solved in that in the equipment according to the invention a position determinator is provided which at long intervals of time or long position intervals gives an accurate position determination of the object and in that the object is provided with an indicator unit which incorporates either a speedometer with an electronic unit which integrates the reading of the speedometer in respect of time or an accelerometer with an electronic unit which double integrates the output signal of the accelerometer in respect of time whereupon the electronic unit in the indicator unit with frequent intervals performs calculation of position by correcting the momentaneous measurement signal value from the indicator unit with the position obtained at one or some of the immediately previously performed position determinations and in that the position is absolutely corrected by the output signal from the position determinator at the intended points of time or intended positions. Previously, one has considered placing an electro-optical distance meter (EDM) so that it measures the distance between a fixed point in the room and a fixed point on the object the position of which is to be determined. The problem of only using an electro-optical distance meter is that the position determination must be performed at frequent intervals of time of the magnitude of less than 1-5 ms and with good accuracy. An EDM instrument does give good accuracy but requires time in order to do so. This means that with an EDM instrument, absolute determinations of the position can only be obtained with the desired precision with a time interval of approx. 1-5 sec. If measurements are performed with closer intervals, an increasingly noisy signal is obtained.

If a speedometer or an accelerometer is placed on the object and integrates or double integrates the output signal from this instrument in respect of the time, then a differential determination of precision with the close intervals of time required is obtained. This is updated and corrected with the absolute position determinations which are preformed with the EDM instrument at wider intervals of time. The use of an accelerometer is usually to be preferred to the use of a speedometer. For one thing, the servo control in many cases shall take place with high accelerations and for another in certain distance measuring instruments, the vertical angle indicator is elaborated as an accelerometer. In the latter case, an already existing instrument can then be used. It is only the electronic processing of the signals from the EDM and accelerometer units incorporated in the instrument which has to be redone. It should be observed that the angle indicator in the equipment according to the invention will be used in an entirely different function than when it is used in a common distance measuring instrument.

The equipment may also have other applications than that mentioned heretofore. The object does not need to be rail-borne. The arrangement is usable at any time when it is desired to know the position of an object which moves along a straight path. Unless a hoirizontal motion is used, compensation for the earth's attraction of gravity must naturally be made, but since this consists of a constant factor, this does not cause any problems.

Figure 2:
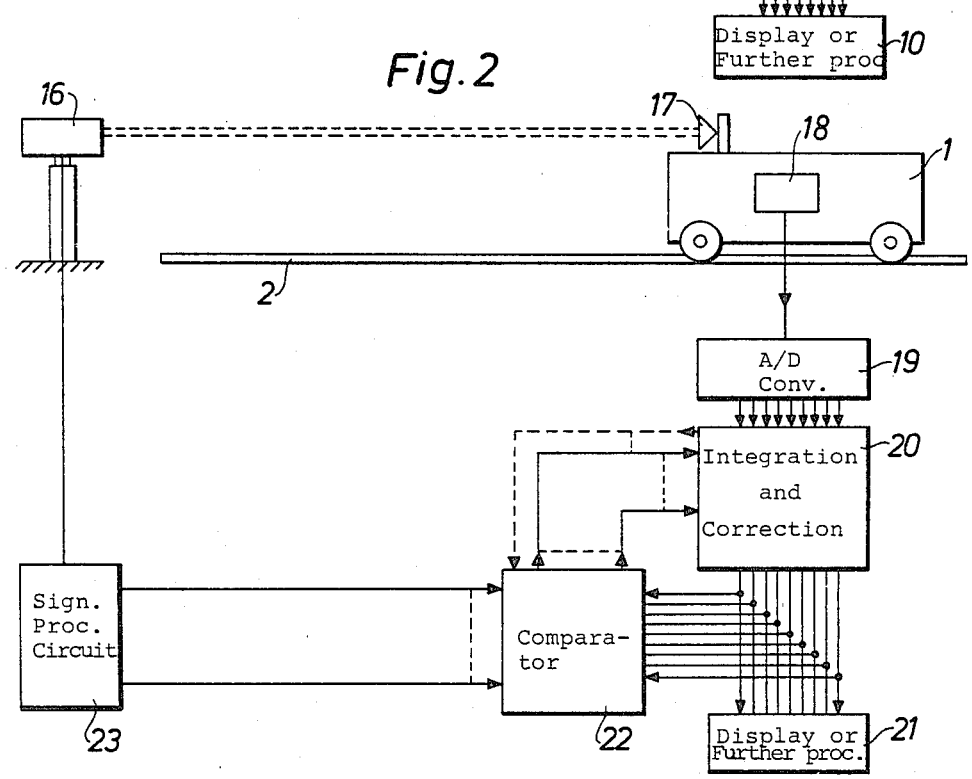

The invention will now be described in more detail with reference to the accompanying drawings, wherein FIG. 1 illustrates a first embodiment of the device according to the invention and FIG. 2 illustrates a second embodiment of the device according to the invention.

Shown in FIG. 1 is a vehicle 1 which can be driven to and fro on rails 2. A distance meter 3 is placed on top of the vehicle. The distance meter 3 comprises an electro-optical distance meter (EDM) aligned to measure against a prism 4 placed in a fixed position in the room. Measurement takes place parallel with the rails 2. The distance meter may also incorporate an accelerometer but an accelerometer does not have to be included in the actual instrument. In the figure an accelerometer 5 is shown placed separately in the vehicle 1.

Using the EDM instrument, measurements are made with relatively long intervals of time such as 1-5 sec. Between times, scanning is performed by the accelerometer 5 with the desired short intervals of time of for example less than 1-5 ms.

The output signal from the accelerometer 5 is fed to a circuit 6 which performs an integration in respect of the time in two steps. Obtained at the first integration is the differential speed to which the speed calculated at the preceding sensing occasion is added as a constant. In the next stage, the obtained speed signal is integrated in respect of the time whereby the differential position is obtained to which the position at the preceding sensing occasion is added. The output of the circuit 6 is fed to an analog-to-digital converter 7. The signal obtained from the converter 7 is fed on the one hand to a display or a connection unit 10 and from there to further processing of the servo for the position control of the vehicle by the position signals and on the other hand to a comparator 8, possibly via a delay unit. Also connected to the comparator 8 is the digital output signal from a signal processing circuit 9 cooperating with the EDM instrument 3. The comparator compares the position determination obtained from the accelerometer 5 via the circuit 6 with the position obtained from the EDM instrument and feeds a correction value via a digital-to-analog converter 11 to the circuit 6. By this means, the position indication obtained by means of the accelerometer is updated with the correct position at suitable intervals.

It should be ovserved that the measuring result from the EDM instrument is very accurate when the vehicle is at a standstill or is nearly stationary. When, in contrast, the vehicle moves at greater speed, the measuring result is influenced since the instrument moves a certain distance while the light beam emitted by its transmitter is received by its receiver. An EDM instrument 3 should therefore not make a measurement when the vehicle speed is so high that the result of the measurement will be misleading. When the result of the speed calculated in the circuit 6 exceeds a certain predetermined value, a blocking signal is therefore fed to the signal processing circuit 9 which blocks the function of the EDM instrument or output of the measuring result from the instrument during such periods.

Also shown in FIG. 1 are optical indicators 13–15 placed at the side of the track of the vehicle 1. These indicate accurately when the vehicle occupies certain specific positions, for instance by a beam of light then being interrupted by the vehicle. These indicators can be used instead of or as a complement to the EDM instrument 3. It should be observed that the EDM instrument 3 can emit signals with certain intervals of time while the optical indicators 13–15 merely indicate certain positions. It is therefore appropriate to have an EDM instrument 3 which continuously gives the position when the vehicle moves along the measuring distance and to have optical indicators placed for example at the end positions of the measuring distance and possibly at one or some strategic points along that distance.

Illustrated in FIG. 2 is a second embodiment of the equipment according to the invention. In this embodiment, an EDM instrument has been placed permanently in the room at one end position of the rails 2. The vehicle 1 has been provided with a prism 17 against which distance measurements are performed by the EDM instrument 16. The vehicle has been equipped with a speedometer 18. This speedometer may either comprise a doppler radar or else a speedometer may be placed at one of the wheels of the vehicle and in a way known per se measure the angular positon of the wheel. The output signal from the speedometer is fed to an analog-to-digital converter and from there to a digitally functioning circuit 20 which integrates the speed signal and corrects the then obtained position signal with the position which was obtained at the immediately preceding measurement. The output signal from circuit 20 is fed partly to a display unit 21 of essentially the same type as unit 10 in FIG. 1 and partly, possibly via a delay unit, to a comparator 22. The output signal from the signal processing circuit 23 to which the output signal from the EDM instrument 16 is fed is conducted to a second input on the comparator 22. The comparator 22 compares the signals from the unit 23 and the unit 20 with each other and feeds a correction value to the circuit 20 depending upon this comparison. In this embodiment, a signal from circuit 20 is fed to block the funtion of the comparator 22 as soon as the indicated speed exceeds a predetermined value. By this means, a corrective influence of distance measurements performed by the EDM instrument when the measuring result is not entirely dependable is prevented.

Several modifications are possible for the invention. For example, an embodiment is conceivable in which the vehicle has both an accelerometer and a speedometer.

We claim:

1. An apparatus for accurately determining the position of an object which is moving along an axis with respect to a fixed reference on the axis without making mechanical contact with the object, comprising first position determination means which can only be operated at relatively long intervals of time for determining the absolute position of said object with respect to said reference at said relatively long intervals of time, said position determination means including means mounted on said object for cooperating with means at said reference to provide said position determination, second position determination means associated with said object for determining the instantaneous position of said object along said axis at relatively frequent intervals of time, said second position determination means including differential position determining means comprising either the combination of speedometer means and electronic integration means for time integrating the output of said speedometer means at relatively frequent time intervals of the combination of accellerometer means and electronic integration means for double time integrating the output of said accellerometer means at relatively frequent intervals of time, and means for correcting the value of said instantaneous measurement signal at said relatively long intervals of time to be equal to said position determination made by said first position determination means.

2. An apparatus according to claim 1, wherein the position determination means is an electronic distance meter aligned in the direction of the axis and arranged to measure the distance between said fixed reference and a predetermined specific point on the object.

* * * * *